Aug. 12, 1930.  H. S. POWELL  1,772,495
RESILIENT COUPLING
Filed Sept. 17, 1926  2 Sheets-Sheet 1
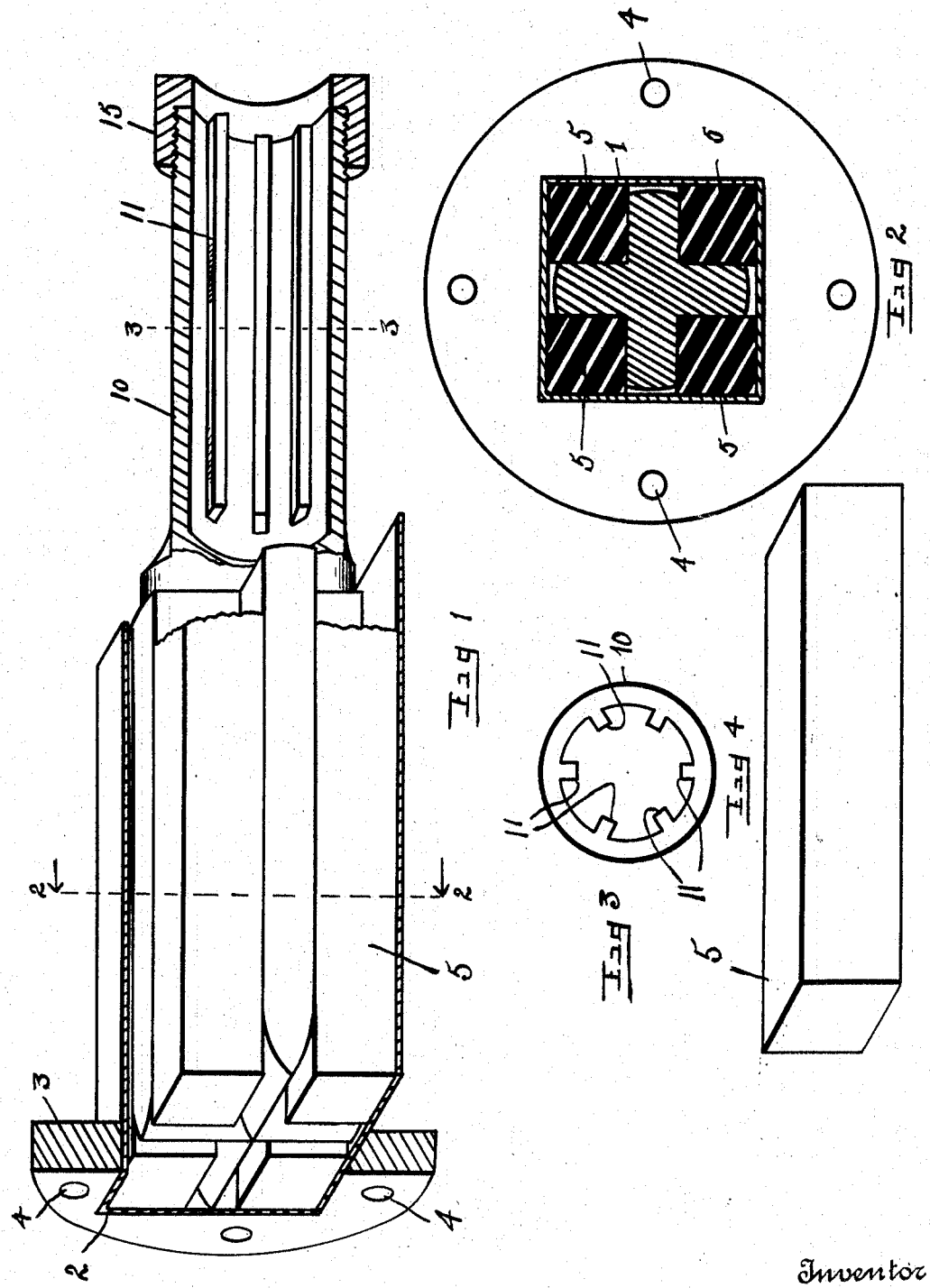
Inventor
Herbert S. Powell
By Thomas L. Wilder
Attorney

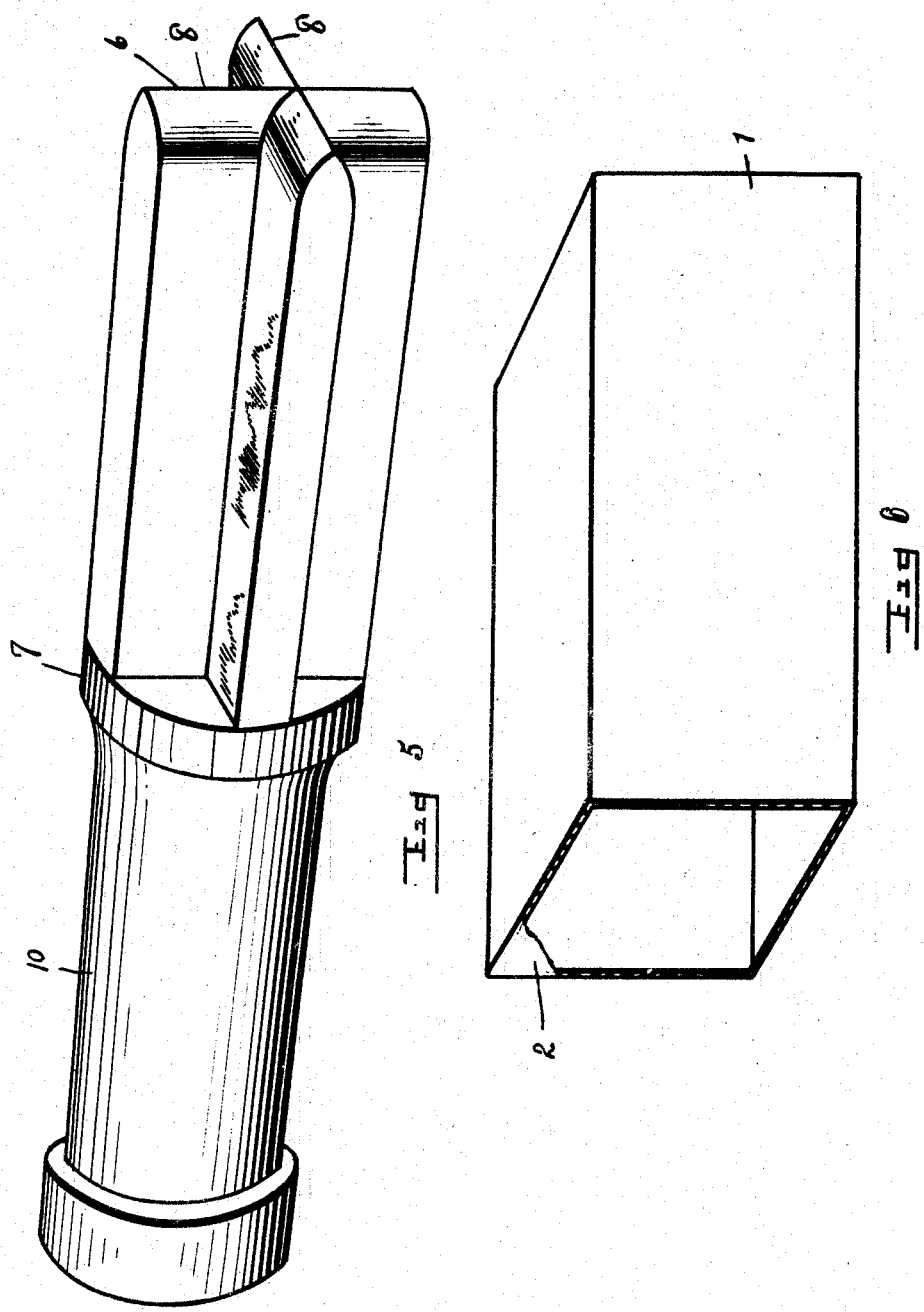

Patented Aug. 12, 1930

1,772,495

UNITED STATES PATENT OFFICE

HERBERT S. POWELL, OF UTICA, NEW YORK

RESILIENT COUPLING

Application filed September 17, 1926. Serial No. 136,163.

My invention relates to a coupling, and I declare the following to be a full, clear, concise and exact description thereof sufficient to enable anyone skilled in the art to which it appertains to make and use the same, reference being had to the accompanying drawings in which like reference characters refer to like parts throughout the specification.

The object of the invention is to provide a coupling for use in connection more particularly between the drive shaft and driven shafts of motor vehicles that will be flexible, whereby to prevent the grinding noise of gears and also to make the coupling more yielding when metal parts come in contact with one another as when the clutch is thrown into gear, and furthermore, to prevent the stripping of gears or other injury to the mechanical parts incident to an overload on the engine.

The device will be understood by referring to the drawings in which:

Fig. 1 is a perspective view showing a central longitudinal section and parts in full.

Fig. 2 is a transverse section taken on the line 2—2 of Fig. 1.

Fig. 3 is a transverse section taken on the line 3—3 of Fig. 1.

Fig. 4 is a detail perspective view of a rubber block employed.

Fig. 5 is a detail perspective view of one of the members employed.

Fig. 6 is a detail perspective view of a square tube casing used.

Referring more particularly to the drawings, the coupling embodies an outer square steel tube 1 being closed at one end, as at 2 and equipped with an annular flange 3. Flange 3 has a series of apertures 4 for the projection of bolts, not shown, that unite the coupling to the driven shaft, not shown, of the motor vehicle.

Four square rubber blocks 5 are disposed within square tube 1. The four rubber blocks 5 are made large enough to completely fill square tube 1. They are forced apart, however, by the star shaped end 6 of metallic member 7, whereby they are compressed very tightly against the inner surface of square tube 1 to prevent the coupling from becoming loose or so that the star shaped part 6 is held under tension at all times. Star shaped end 6 of member 7 is made in the form of a cross with its free ends terminating in wedge-shaped edges, 8, 8 disposed at right angles to each other and adapted to penetrate between rubber blocks 5, whereby to force said blocks 5 into contact with the inner surfaces of tube 1 and, thereby hold said parts in a rigid manner with said tube 1 to enable them to turn together.

The outer end 10 of member 7 is hollow. Ribs 11 are made integral with the inner surface thereof. Corresponding ribs, not shown, on the drive shaft of the engine, also not shown, fit between ribs 11, whereby to cause the coupling to turn therewith. A stuffing box or gland 15 is screw threaded to the outer surface of end 10, whereby to prevent the dirt from entering the hollow interior of end 10 of member 7.

Having thus described my invention, what I claim as new and desire to secure by Letters Patent is as follows:—

1. In a coupling adapted to be connected to a driving shaft and a driven shaft, a member having ribs for attaching it to said driving shaft, a square shaped tube adapted to be connected to a driven shaft, a cross shaped member connected to said first named member and located within said tube and flexible means disposed between said cross shaped member and said tube, whereby to allow a certain amount of yield.

2. In a coupling adapted to be connected to a driving and a driven shaft, a member having a recess with ribs disposed therein, whereby to connect said member to a driving shaft, a square shaped member having a flange thereon, whereby to be connected to a driven shaft, said first named member having wedge shaped means adapted to be projected into said square shaped member and removable rubber members disposed between said member and said angular members, whereby to allow a yield between the parts.

3. In a coupling adapted to be connected to a driving shaft and a driven shaft, a member adapted to be connected to a driving shaft, a square shaped member adapted to be connected to a driven shaft, an elongated yielding means disposed therebetween for allowing a certain degree of flexibility between said members.

4. In a coupling adapted to be connected to a driving shaft and a driven shaft, a member adapted to be connected to a driving shaft, a square shaped member adapted to be connected to a driven shaft, an elongated yielding means disposed in said member allowing a certain degree of flexibility therebetween.

In testimony whereof I affix my signature.

HERBERT S. POWELL.